United States Patent

Furuta et al.

Patent Number: 5,681,785
Date of Patent: Oct. 28, 1997

[54] CASTABLE REFRACTORY CONTAINING ALUMINA COARSE GRAINS

[75] Inventors: Kazuhiro Furuta; Yusuke Urita; Minoru Kataoka; Hiroshi Kubota; Mitsuo Sugawara, all of Kitakyushu, Japan

[73] Assignee: Krosaki Corporation, Fukuoka-ken, Japan

[21] Appl. No.: 738,931

[22] Filed: Oct. 28, 1996

[51] Int. Cl.[6] ........................ C04B 35/043; C04B 35/101
[52] U.S. Cl. .................. 501/119; 501/120; 501/121; 501/122; 501/124; 501/125; 501/128; 501/133
[58] Field of Search ........................ 501/119, 120, 501/121, 122, 124, 125, 127, 153, 154, 128, 133

[56] References Cited

U.S. PATENT DOCUMENTS

| | | | |
|---|---|---|---|
| 4,990,475 | 2/1991 | Matsumoto et al. | 501/120 |
| 5,135,896 | 8/1992 | Vezza | 501/120 |
| 5,283,215 | 2/1994 | Hosokawa et al. | 501/120 |
| 5,506,181 | 4/1996 | Matsumoto et al. | 501/120 |
| 5,578,538 | 11/1996 | Nishikawa et al. | 501/124 |

FOREIGN PATENT DOCUMENTS

| | | |
|---|---|---|
| 60-60985 | 4/1985 | Japan . |
| 60-180699 | 6/1985 | Japan . |
| 3-23275 | 1/1991 | Japan . |
| 6-056541 | 3/1994 | Japan . |
| 6-072776 | 3/1994 | Japan . |
| 6-256064 | 9/1994 | Japan . |
| 6-345550 | 12/1994 | Japan . |
| 7-223874 | 8/1995 | Japan . |
| 0800275A | 1/1996 | Japan . |
| 8-175877 | 7/1996 | Japan . |

*Primary Examiner*—Mark L. Bell
*Assistant Examiner*—David Sample
*Attorney, Agent, or Firm*—Jordan and Hamburg

[57] ABSTRACT

A castable refractory which comprises a matrix, making up 100 wt % in total, composed of 3–20 wt % of magnesia clinker having a particle diameter smaller than 0.21 mm and containing more than 95 wt % of MgO and 0.5–3.0 wt % of alumina cement in terms of CaO, with the remainder being alumina, and 0.1–3 wt % of ultrafine powder of amorphous silica and 3–9 wt % of alumina coarse grains having a particle diameter of 8–20 mm, both in terms of outer percentage of the amount of the matrix.

3 Claims, 2 Drawing Sheets

(TEST 1)

(TEST 2)

(TEST 3)

(TEST 4)

(TEST 5)

(TEST 6)

CASTABLE REFRACTORY CONTAINING ALUMINA COARSE GRAINS

BACKGROUND OF THE INVENTION

1. Field of the Invention

The present invention relates to a castable refractory which, because of its good corrosion and spalling resistance, can be used for ladle lining, for submerged nozzles for the DH process and RH process, and for any part that comes into contact with molten iron or steel as a base material for the tundish.

2. Description of the Related Art

Recent advances in refining technology for high grade steel require operation under more extreme conditions, such as higher steel melting temperatures and longer dwell times. Such requirements are not met by conventional high-alumina refractories, magnesia refractories, and silica-zircon refractories because they lack sufficient corrosion resistance and spalling resistance. Thus, they have been replaced by spinel refractories. Spinel clinker is characterized by a low thermal expansion coefficient, high slag penetration resistance, corrosion, and spalling resistance. The application of spinel clinker is embodied in a spinel-alumina unshaped refractory (as disclosed in Unexamined Japanese Patent Publication No. Sho 60-60985) and a spinel-alumina-magnesia castable refractory (as disclosed in Unexamined Japanese Patent Publication No. Hei 3-23275). There is known another unshaped refractory with improved corrosion resistance and spalling resistance which is formed from an alumina-magnesia mix incorporated with alumina coarse grains having a particle diameter of 10–50 mm (as disclosed in Unexamined Japanese Patent Publication No. Hei 8-2975 and U.S. Pat. No. 5,506,181).

The former is subject to considerable melting loss under severe operating conditions. The second and third ones are intended to overcome this disadvantage and improve corrosion and spalling resistance by the combined use of magnesia clinker and spinel clinker. Nevertheless, they still lack sufficient spalling resistance and are susceptible to peeling in cases of intermittent operation (a mode of operation in which there is a long wait between the discharging and charging of molten steel from and into the melting container).

SUMMARY OF THE INVENTION

It is an object of the present invention to provide a alumina-magnesia-based or alumina-magnesia-spinel-based castable refractory which exhibits good corrosion resistance, slag penetration resistance, and spalling resistance under severe conditions.

The first aspect of the present invention resides in a castable refractory which comprises a matrix, making up 100 wt % in total composed of 3–20 wt % of magnesia clinker having a particle diameter smaller than 0.21 mm and containing more than 95 wt % of MgO and 0.5–3.0 wt % of alumina cement in terms of CaO, with the remainder being alumina, and 0.1–3 wt % of ultrafine powder of amorphous silica and 3–9 wt % of alumina coarse grains having a particle diameter of 8–20 mm, both in terms of outer percentage of the amount of the matrix.

In slightly different terms, the first aspect of the invention resides in a castable refractory which comprises:

(i) 100 parts by weight of a matrix composed of:
  (a) 3–20 wt % magnesia clinker having a particle diameter smaller than 0.21 mm and containing at least 95 wt % MgO;
  (b) 0.5–3 wt % alumina cement in terms of CaO; and
  (c) remainder alumina;
(ii) 0.1–3 parts by weight ultrafine amorphous silica; and
(iii) 3–9 parts by weight alumina coarse grains having a particle diameter of 8–20 mm.

The second aspect of the present invention resides in a castable refractory which comprises a matrix, making up 100 wt % in total composed of 3–20 wt % of magnesia clinker having a particle diameter smaller than 0.21 mm and containing more than 95 wt % of MgO and 0.5–3.0 wt % of alumina cement in terms of CaO, with the remainder being alumina raw material and spinel raw material in a ratio of 1 to 1–0.05, and 0.1–3 wt % of ultrafine powder of amorphous silica and 3–9 wt % of alumina coarse grains having a particle diameter of 8–20 mm, both in terms of outer percentage of the amount of the matrix.

In slightly different terms, the second aspect of the invention resides in a castable refractory which comprises:

(i) 100 parts by weight of a matrix composed of:
  (a) 3–20 wt % magnesia clinker having a particle diameter smaller than 0.21 mm and containing at least 95 wt % MgO;
  (b) 0.5–3 wt % alumina cement in terms of CaO; and
  (c) remainder alumina raw material and spinel raw material in a weight ratio of 1:1 to 1:0.05;
(ii) 0.1–3 parts by weight ultrafine amorphous silica; and
(iii) 3–9 parts by weight alumina coarse grains having a particle diameter of 8–20 mm.

According to the third aspect of the present invention, the above-mentioned castable refractories are modified so that the alumina coarse grains are partly or entirely replaced by MgO-$Al_2O_3$ spinel containing more than 70 wt % of $Al_2O_3$.

The castable refractory of the present invention is improved in corrosion resistance and strength and particularly in spalling resistance owing to the combination of an alumina-magnesia material or alumina-magnesia-spinel material with alumina coarse grains or spinel coarse grains.

DESCRIPTION OF THE PREFERRED EMBODIMENTS

Figure 1:
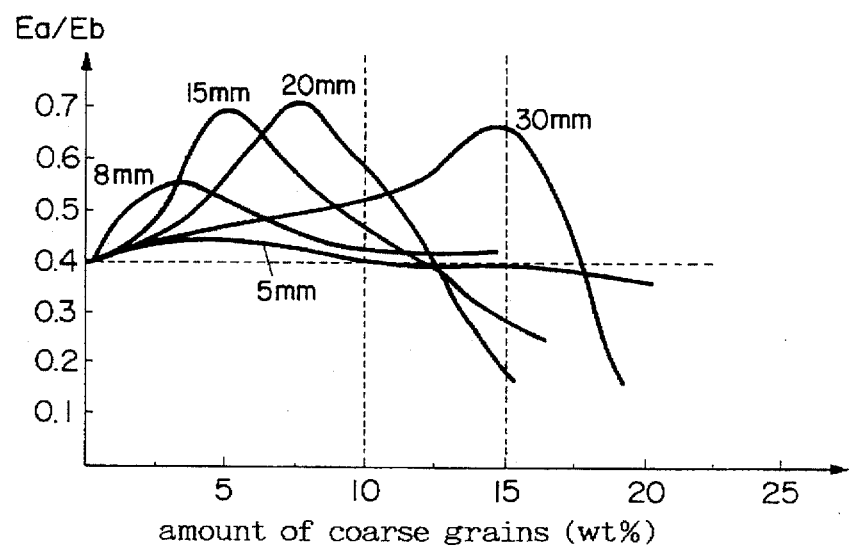
FIGS. 1 to 6 is a graphical representation of the spalling resistance (in terms of the ratio of elastic modulus plotted against the number of repetitions of heating and cooling cycles) of the samples (shown in Table 1) containing alumina coarse grains having a particle diameter of 5–30 mm.

The refractory of the present invention is based on a matrix which is characterized in that magnesia clinker has a particle diameter smaller than 0.21 mm and contains more than 95 wt % of MgO. The small particle diameter is necessary to ensure a rapid reaction with alumina to form fine spinel. The particle diameter of magnesia clinker should preferably be smaller than 0.075 mm. The high content of MgO is necessary to minimize the entrance of flux components and to prevent the formation of low-melting substances. The magnesia clinker should be used in an amount of 3–20 wt %. With an amount less than 3 wt %, it will not produce as much spinel as required for a compact structure. Thus the resulting refractory will lack sufficient corrosion resistance and slag penetration resistance. With an amount more than 20 wt %, it will produce an excess amount of spinel which deteriorates the structure due to expansion.

The amorphous silica is intended to improve slaking resistance and to promote the reaction to form spinel through the liquid phase formation. With an amount less than 0.1 wt %, it will not produce the desired effect; with an amount more than 3 wt %, excessively form the liquid phase, adversely affecting corrosion resistance.

The alumina cement as a binder should be one which contains CaO in an amount less than 50 wt %, preferably less than 30 wt %. It should be used in an amount of 0.5–3.0 wt % in terms of CaO. With an amount less than 0.5 wt %, it will not fully contribute to strength; with an amount more than 3.0 wt %, it will excessively form the liquid phase.

A preferred clinker is one of sintered alumina, electrofused alumina, or calcined alumina which contains more than 80 wt % of $Al_2O_3$. It should have a particle diameter of about 0.075 mm, and it should be used in an amount less than 30 wt % of the amount of alumina raw material, so that it contributes to the formation of normal spinel.

The spinel raw material is a clinker with a low level of impurities, such as sintered spinel and electrofused spinel. It is used to improve the corrosion resistance to FeO-containing slag. Incidentally, the MgO content in the spinel raw material is not specifically restricted. It includes all the spinel components detected by X-ray diffractometry.

The alumina raw material may be used alone or in combination with the spinel raw material in an amount of 94–65 wt %. With an excessively large amount, they will not permit other materials to exhibit their characteristic properties. With an excessively small amount, they will make it necessary to increase the amount of other materials, which leads to the formation of low-melting minerals. The combined use of spinel raw material improves corrosion resistance but increases slag penetration resistance. Therefore, the ratio of alumina raw material to spinel raw material should be 1 to 1–0.05 for good spalling resistance. According to the present invention, the matrix is incorporated with 3–9 wt % (outer percentage) of alumina coarse grains having a particle diameter of 8–20 mm. The alumina coarse grains may be partly or entirely replaced by $MgO-Al_2O_3$ spinel coarse grains containing more than 70 wt % of $Al_2O_3$. The alumina coarse grains should preferably be a clinker containing more than 80 wt % of $Al_2O_3$, such as sintered alumina, electrofused alumina, and calcined alumina. The $MgO-Al_2O_3$ spinel coarse grains include sintered spinel and electrofused spinel which have a low level of impurities. It is known that a castable refractory is incorporated with alumina coarse grains having a particle diameter of 10–50 mm. However, the present invention is based on the finding that it is possible to improve spalling resistance by selecting an adequate amount of alumina coarse grains and by combination with the matrix.

Figure 2:
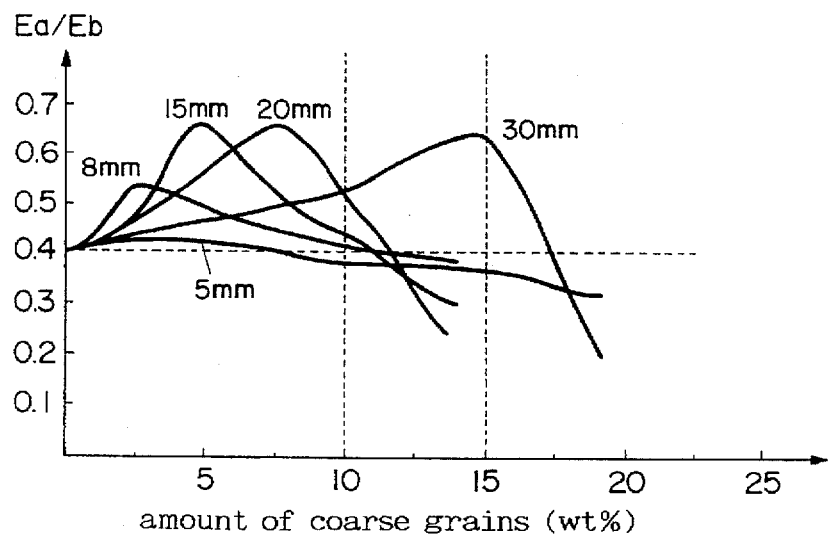
Figure 3:
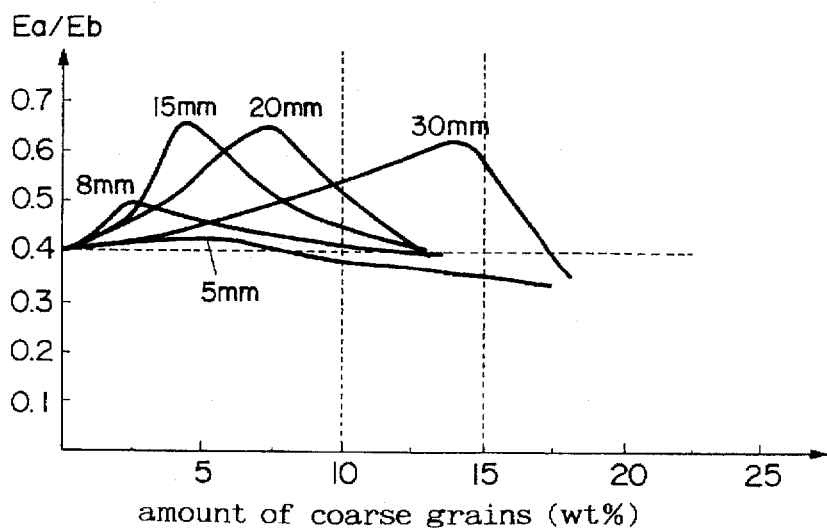
Figure 4:
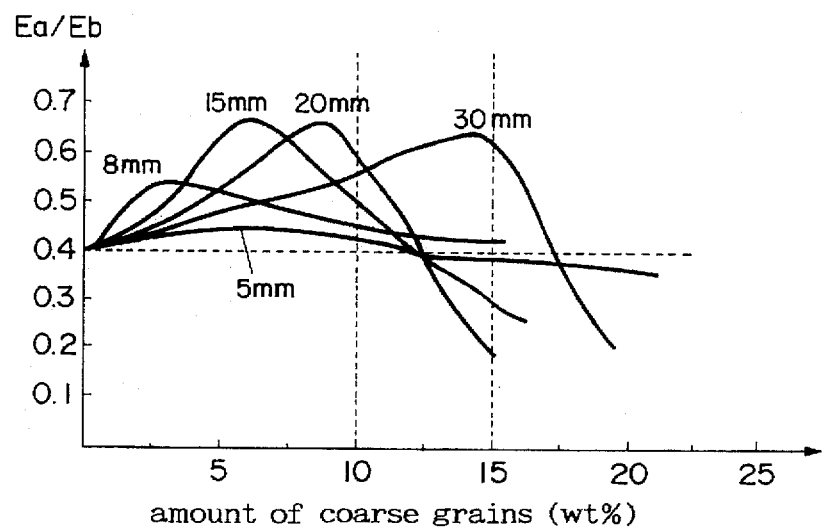
Figure 5:
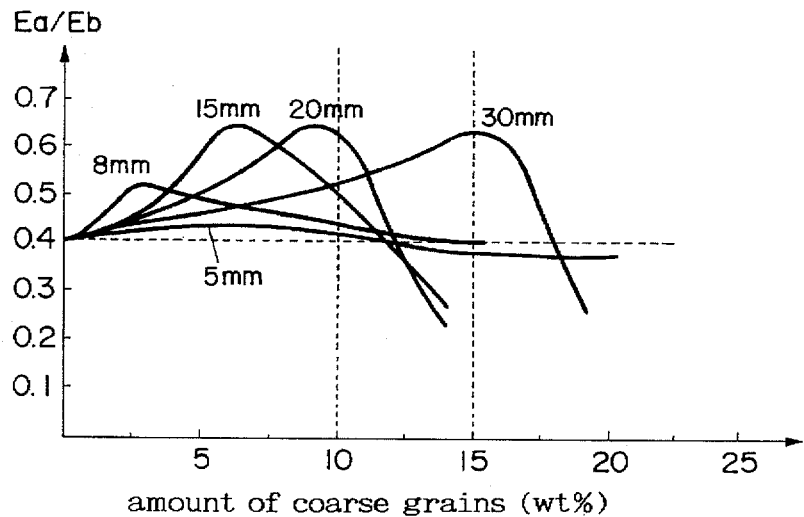
Figure 6:
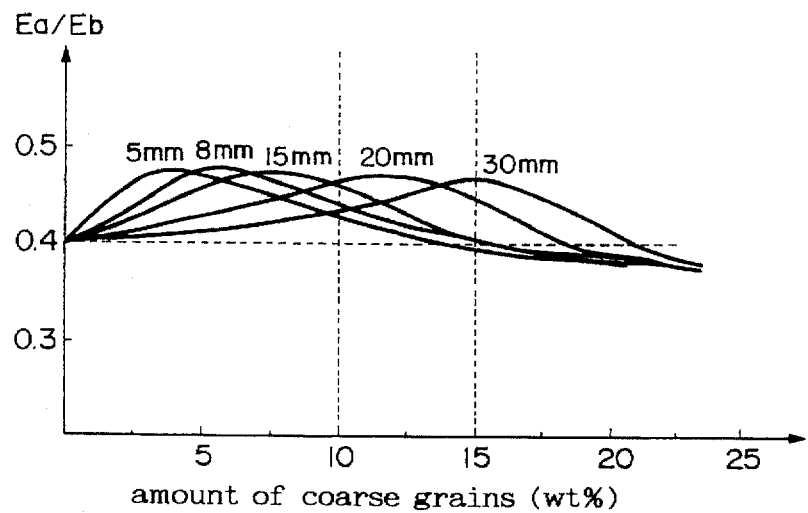

To measure the effect of alumina coarse grains (with a particle diameter of 5–30 mm) on the spalling resistance of the castable refractory, several samples were prepared according to the formulation shown in Table 1. The results of the test are shown in FIGS. 1 to 6. The spalling resistance was quantitatively expressed in terms of the change in elastic modulus of the samples which was observed before and after the thermal spalling test. The occurrence of thermal spalling is inferred from the fact that any sample decreases in elastic modulus if it suffers thermal spalling and becomes defective during the test.

The change in the rate of elastic modulus after the spalling test is associated with the occurrence of cracks as shown in Table 2. It is expressed in terms of Ea/Eb, where Ea is the elastic modulus after the spalling test and Eb is the elastic modulus before the spalling test. It turned out that the lower the value of Ea/Eb, the lower the spalling resistance. The thermal spalling test was performed on a specimen (measuring 65×114×230 mm) fired at 1500° C. for 3 hours. The test consists of twice repeating the cycles of heating the specimen at 1450° C. for 1 hour and compulsorily cooling the specimen at normal temperature for 30 minutes. It was concluded from the result of the spalling resistance test (shown in FIGS. 1 to 6) that the specimens Nos. 1 to 5 which contained alumina-rich spinel containing more than 70 wt % $Al_2O_3$ and alumina coarse grains showed small decrease in ratio of elastic modulus, and the number of cracks was small and the degree of crack propagation was low in It was also concluded that the decrease in the ratio of elastic modulus was large and cracking due to thermal spalling was significant in both number and propagation in specimen No. 6 which contained $MgO-Al_2O_3$ spinel containing less than 70 wt % $Al_2O_3$. It is noted from FIGS. 1 to 6, that the alumina coarse grains are not fully effective in improving spalling resistance if their particle diameter is less than 8 mm. The larger the particle diameter of the alumina coarse grains, the more necessary it is to add more alumina coarse grains to achieve maximum spalling resistance. The spalling resistance is maximum when alumina coarse grains having a particle diameter of 30 mm are added in an amount of 15 wt %. Using such a large amount of alumina coarse grains to improve spalling resistance is not desirable for thin refractories or complicatedly shaped refractories because they would cause clogging during casting. For this reason, the present invention specifies that the alumina coarse grains to be added for improvement of the spalling resistance should have a particle diameter of less than 20 mm. Alumina coarse grains with a particle diameter of 8–20 mm are effective in improving spalling resistance only when the amount added exceeds 3 wt %.

The effect of alumina coarse grains (with a particle diameter of 8–20 mm) on the improvement of spalling resistance increases in proportion to the amount added and then decreases beyond a certain amount (say, 10 wt %). There even is an instance where the alumina coarse grains produce no effect when added in excess of 10 wt %. Therefore, the present invention specifies that the amount of alumina coarse grins should be in the range of 3–10 wt %.

The refractory of the present invention may be incorporated with a small amount of additives given below for workability improvement and cure time adjustment. Sodium tripolyphosphate, sodium hexametaphosphate, sodium ultrapolyphosphate, sodium acid hexametaphosphate, sodium borate, sodium carbonate, sodium citrate, sodium succinate, sodium polyaurinate, sodium sulfonate, boric acid, ammonium borate, lithium carbonate, metal fiber, metal powder, etc.

EXAMPLES

Examples and Comparative Examples are summarized in Tables 3 and 4, respectively. The test methods used in them are explained below.

Corrosion resistance test (rotary test): This test consists of repeating 10 times the immersion of specimens (80×100× 230 mm) in slag (having a $CaO/SiO_2$ ratio of 3.1 and containing 11.7% Fe in total) at 1650° C. at an interval of 1 hour. The amount of corrosion and the amount of slag penetration resistance are measured.

Modulus of rupture: Measured for specimens (40×40×160 mm) according to JIS R-2213 after drying at 110° C. for 24 hours and after firing at 1500° C. for 3 hours. A rate of permanent linear change was also measured according to JIS R-2208.

Slaking test: This test consists of boiling specimens in an autoclave at 5 atm for 3 hours and checking them for cracking. This test is intended to predict if samples crack after drying.

Spalling test: This test consists of repeating 10 times the cycle of heating specimens (80×100×230 mm) at 1650° C. for 1 hour and compulsorily air-cooling them to 800° C. and recording the number of cycles required for the specimens to crack. Incidentally, the alumina cement used in the Examples is one which contains 18 wt % CaO.

Examples 1 and 2

The samples in these examples contained a matrix composed of 7 wt % of magnesia and 1.3 wt % of alumina cement (in terms of CaO), with the remainder being alumina raw material, and 1 wt % of amorphous silica and 5 wt % and 8 wt % of alumina coarse grains (8–20 mm in diameter), respectively, in terms of outer percentage of the matrix. The samples were superior in corrosion resistance, slag penetration resistance, and strength after drying and firing. Also, they posed no problem with slaking and they showed good spalling resistance as indicated by the large number of heating-cooling cycles required for the samples to crack.

Examples 3 to 5

The samples in these examples contained the combination of alumina coarse grains and spinel coarse grains ($MgO:Al_2O_3$=5:95), alumina coarse grains and spinel coarse grains ($MgO:Al_2O_3$=27.3:71.7), and these two kinds of spinel coarse grains, respectively, making up 5 wt % in total in outer percentage to the same matrix as used in Example 1. The samples were superior in all the characteristic properties.

Examples 6 and 7

The samples in these examples contained 5 wt % each of spinel coarse grains of a different type as for the same matrix as used in Example 1. The samples were superior in all the characteristic properties.

Example 8

The samples in this example were the same as in Example 1 except that one half of the alumina raw material was replaced by spinel raw material. The sample showed improved corrosion resistance.

Example 9 and 10

The samples in these examples differed from Example 1 in that the amount of magnesia clinker was changed to 5 wt % and 20 wt %, respectively. They showed good corrosion resistance in proportion to the amount of magnesia clinker. However, they were not significantly different from each other in the amount of melting loss.

Example 11

The samples in this example differed from Example 1 in that the amount of the amorphous silica was reduced to 0.5 wt %. The sample exhibited a slightly improved strength.

Example 12

The samples in this example differed from Example 1 in that the amount of the amorphous silica was increased to 3 wt % (outer percentage). The sample exhibited a largely improved strength.

Examples 13 and 14

The samples in these examples contained respectively 0.5 wt % and 2.7 wt % of alumina cement (in terms of CaO). They showed strength in proportion to the amount of cement. They were superior in corrosion resistance and spalling resistance.

Examples 15 and 16

The samples in these examples contained a matrix composed of 15 wt % of magnesia clinker, 60 wt % of alumina raw material, 0.9 wt % of alumina cement (in terms of CaO), and 20 wt % of spinel raw material, and 0.1 wt % of amorphous silica, and 3 wt % of alumina coarse grains in combination with 2 wt % of spinel coarse grains of $MgO:Al_2O_3$=5:95 or $MgO:Al_2O_3$=27.3:71.7, making up 5 wt % in total, in terms of outer percentage. These samples exhibited good physical properties except for a slight decrease in strength.

Example 17

The samples in this example contained a matrix composed of 3 wt % of magnesia clinker and 2.7 wt % of alumina cement (in terms of CaO), and 0.1 wt % of amorphous silica, with 2 wt % each of alumina coarse grains, spinel coarse grains of $MgO:Al_2O_3$=5:95, and spinel coarse grains of $MgO:Al_2O_3$=27.3:71.7, respectively, making up 6 wt % in total, in terms of outer percentage. These samples were superior in corrosion resistance, spalling resistance, strength, and slaking resistance.

Comparative Example 1

The samples in this comparative example differed from Example 1 in that they contained no alumina coarse grains. The sample was poor in corrosion resistance and spalling resistance.

Comparative Examples 2, 3, and 8

The samples in these comparative examples differed from Example 1 in that the amount of alumina coarse grains was changed to 20 wt %, 30 wt %, and 10 wt %, respectively. The samples were satisfactory in corrosion resistance, strength, and slaking; however, they had low values of the ratio of elastic modulus and were poor in spalling resistance (in terms of the number of heating-cooling cycles required for cracking to occur).

Comparative Examples 4 and 5

The samples in these comparative examples contained the combination of spinel coarse grains of $MgO:Al_2O_3$=5:95 and $MgO:Al_2O_3$=27.3:71.7 and the combination of alumina coarse grains and spinel coarse grains $MgO:Al_2O_3$=27.3:71.7, respectively. They had a small value of the ratio of elastic modulus and were poor in spalling resistance.

Comparative Examples 6 and 7

The samples in these comparative examples contained respectively 50 wt % and 5 wt % (outer percentage) of spinel coarse grains ($MgO:Al_2O_3$=40:60) as for the same matrix as defined above. They were poor in spalling resistance.

Comparative Example 9

The samples in this comparative example differed from Example 1 in that the alumina raw material was partly replaced by spinel raw material (50 wt %). It showed a low amount of corrosion but a high amount of slag penetration resistance. Overall, it was poor in corrosion resistance.

Comparative Examples 10 and 11

The samples in these comparative examples contained respectively 2 wt % and 30 wt % of magnesia clinker in the matrix. They were extremely poor in corrosion resistance due to spinel deficiency and excess spinal swelling which adversely affected the structure.

Comparative Examples 12 and 13

The samples in these comparative examples contained respectively 0 wt % and 5 wt % of amorphous silica in outer percentage. The sample without amorphous silica was poor in slaking resistance and the sample with 5 wt % amorphous silica was poor in corrosion resistance due to the increase of low-melting $Al_2O_3$-$MgO$-$SiO_2$.

Comparative Examples 14 and 15

The samples in these comparative examples contained respectively 0.18 wt % and 3.6 wt % of alumina cement (in terms of CaO). The former sample was poor in strength and the latter sample was poor in corrosion resistance.

Comparative Example 16

The sample in this comparative example differed from that of Example 1 in that the amount of alumina coarse grains was increased to 120 wt %. It showed a significant decrease in strength after drying and firing.

TABLE 1

|  |  | Test 1 | Test 2 | Test 3 | Test 4 | Test 5 | Test 6 |
|---|---|---|---|---|---|---|---|
| Alumina raw material | 5–1 mm | 86 | 43 | 83 | 86 | 86 | 86 |
| Spinel raw material | 5–1 mm |  | 43 |  |  |  |  |
| Magnesia clinker | <0.21 mm | 7 | 7 | 10 | 7 | 7 | 7 |
| Alumina cement | (CaO) | 1.3 | 1.3 | 1.3 | 1.3 | 1.3 | 1.3 |
| Amorphous silica |  | +1 | +1 | +1 | +1 | +1 | +1 |
| Alumina coarse grains | 30–5 mm | +0 ~ 20 | +0 ~ 20 | +0 ~ 20 |  |  |  |
| Spinel coarse grains ($MgO:Al_2O_3 = 5:95$) | 30–5 mm |  |  |  | +0 ~ 20 |  |  |
| Spinel coarse grains ($MgO:Al_2O_3 = 27.3:71.7$) | 30–5 mm |  |  |  |  | +0 ~ 20 |  |
| Spinel coarse grains ($MgO:Al_2O_3 = 40:60$) | 30–5 mm |  |  |  |  |  | +0 ~ 20 |

TABLE 2

| Cracking due to thermal spalling | Elastic modulus | Ratio of elastic modulus (Ea/Eb) |
|---|---|---|
| None | Ea = Eb | 1 |
| Yes | Ea > Eb | <1 |

Eb: elastic modulus measured before thermal spalling test
Ea: elastic modulus measured after thermal spalling test

TABLE 3

| | Example No. | | | | | | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 |
| Formulaiton (wt %) | | | | | | | | | | | | | | | | | |
| Magnesia clinker (<0.21 mm) | 7 | 7 | 7 | 7 | 7 | 7 | 7 | 7 | 5 | 20 | 7 | 7 | 7 | 7 | 15 | 15 | 3 |
| Alumina raw material (5–1 mm) | 86 | 86 | 86 | 86 | 86 | 86 | 86 | 43 | 88 | 73 | 86 | 86 | 90 | 78 | 60 | 60 | 77 |
| Spinel raw material (5–1 mm) |  |  |  |  |  |  |  | 43 |  |  |  |  |  |  |  | 20 | 20 |
| Amorphous silica | +1 | +1 | +1 | +1 | +1 | +1 | +1 | +1 | +1 | +1 | +0.5 | +3 | +1 | +1 | +0.1 | +0.1 | +0.1 |
| Alumina cement (CaO) | 1.3 | 1.3 | 1.3 | 1.3 | 1.3 | 1.3 | 1.3 | 1.3 | 1.3 | 1.3 | 1.3 | 1.3 | 0.5 | 2.7 | 0.9 | 0.9 | 2.7 |
| Alumina coarse grains (20–8 mm) | +5 | +8 | +3 |  | +3 |  |  | +5 | +5 | +5 | +5 | +5 | +5 | +5 | +3 | +3 | +2 |
| Spinel coarse grains (20–8 mm) ($MgO:Al_2O_3 = 5:95$) |  |  | +2 | +3 |  | +5 |  |  |  |  |  |  |  |  | +2 |  | +2 |
| Spinel coarse grains (20–8 mm) ($MgO:Al_2O_3 = 27.3:71.7$) |  |  |  | +2 | +2 |  | +5 |  |  |  |  |  |  |  |  | +2 | +2 |
| Charatcteristic | | | | | | | | | | | | | | | | | |

TABLE 3-continued

| | Example No. | | | | | | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 |
| properties | | | | | | | | | | | | | | | | | |
| Rotary corrosion test | | | | | | | | | | | | | | | | | |
| Amount of corrosion | 9 | 8 | 8 | 8 | 9 | 8 | 7 | 6 | 10 | 5 | 7 | 12 | 7 | 12 | 7 | 7 | 10 |
| Amount of slag infiltration | 7 | 7 | 8 | 8 | 7 | 8 | 9 | 9 | 6 | 10 | 8 | 4 | 8 | 3 | 7 | 8 | 5 |
| Total amount of melting loss (mm) | (16) | (15) | (16) | (16) | (16) | (16) | (16) | (15) | (16) | (15) | (15) | (16) | (15) | (15) | (14) | (15) | (15) |
| 110° C. × 24 h, modulus of rupture (MPa) | 8.9 | 8.8 | 8.7 | 8.8 | 8.9 | 8.8 | 8.7 | 9.0 | 8.0 | 9.9 | 7.9 | 11.6 | 7.8 | 12.2 | 7.0 | 7.1 | 8.1 |
| 1500° C. × 3 h, modulus of rupture (MPa) | 31.2 | 31.1 | 30.6 | 31.1 | 31.0 | 30.9 | 30.8 | 31.1 | 30.9 | 29.9 | 28.8 | 49.6 | 29.6 | 46.6 | 27.7 | 27.9 | 34.6 |
| 1500° C. × 3 h, permanent linear change | +1.55 | +1.50 | +1.49 | +1.50 | +1.51 | +1.49 | +1.48 | +1.51 | +1.33 | +1.76 | +1.63 | +1.22 | +1.47 | +1.40 | +1.50 | +1.51 | +1.39 |
| Slaking test, cracking | no | no | no | no | no | no | no | no | no | no | no | no | no | no | no | no | no |
| Spalling test: number of cycles for cracking to occur | 8 | 9 | 8 | 8 | 8 | 8 | 8 | 8 | 9 | 9 | 8 | 8 | 8 | 8 | 8 | 8 | 8 |
| Spalling test: ratio of elastic modulus (Ea/Eb) | 0.60 | 0.58 | 0.57 | 0.56 | 0.57 | 0.57 | 0.56 | 0.59 | 0.61 | 0.57 | 0.60 | 0.56 | 0.59 | 0.56 | 0.59 | 0.58 | 0.57 |

TABLE 4

| | Comparative Example No. | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| Formulation (wt %) | | | | | | | | | | | | | | | | |
| Magnesia clinker (<0.21 mm) | 7 | 7 | 7 | 7 | 7 | 7 | 7 | 7 | 7 | 2 | 30 | 7 | 7 | 7 | 7 | 7 |
| Alumina raw material (5–1 mm) | 86 | 86 | 86 | 86 | 86 | 86 | 86 | 86 | 36 | 91 | 63 | 86 | 86 | 92 | 73 | 86 |
| Spinel raw material (5–1 mm) | | | | | | | | | 50 | | | | | | | |
| Amorphous silica | +1 | +1 | +1 | +1 | +1 | +1 | +1 | +1 | +1 | +1 | +1 | — | +5 | +1 | +1 | +1 |
| Alumina cement (CaO) | 1.3 | 1.3 | 1.3 | 1.3 | 1.3 | 1.3 | 1.3 | 1.3 | 1.3 | 1.3 | 1.3 | 1.3 | 1.3 | 0.18 | 3.6 | 1.3 |
| Alumina coarse grains (20–8 mm) | | +20 | +30 | | +10 | | | +10 | | +50 | +50 | +50 | +50 | +50 | +50 | +120 |
| Spinel coarse grains (20–8 mm) (MgO:Al₂O₃ = 5:95) | | | | +10 | | | | | | | | | | | | |
| Spinel coarse grains (20–8 mm) (MgO:Al₂O₃ = 27.3:71.7) | | | | +10 | +20 | | | | | | | | | | | |
| Spinel coarse grains (20–8 mm) (MgO:Al₂O₃ = 40:60) | | | | | | +50 | +5 | | | | | | | | | |
| Characteristic properties | | | | | | | | | | | | | | | | |
| Rotary corrosion test | | | | | | | | | | | | | | | | |
| Amount of corrosion | 15 | 9 | 8 | 8 | 7 | 5 | 7 | 9 | 5 | 20 | 4 | 7 | 21 | 7 | 14 | 10 |
| Amount of slag infiltration | 5 | 6 | 6 | 7 | 7 | 9 | 7 | 6 | (15) | 3 | 20 | 7 | 6 | 7 | 3 | 7 |
| Total amount of melting loss (mm) | (20) | (15) | (14) | (15) | (14) | (14) | (14) | (15) | (20) | (23) | (24) | (14) | (27) | (14) | (17) | (17) |
| 110° C. × 24 h, modulus of rupture (MPa) | 9.3 | 8.8 | 8.7 | 8.8 | 8.8 | 98.4 | 8.9 | 9.0 | 8.4 | 7.7 | 8.4 | 2.1 | 13.4 | 5.6 | 14.6 | 2.6 |
| 1500° C. × 3 h, modulus of rupture (MPa) | 31.6 | 31.3 | 31.6 | 31.7 | 31.8 | 30.3 | 32.6 | 32.8 | 31.6 | 30.4 | 13.6 | 9.3 | 39.6 | 21.3 | 41.3 | 14.0 |
| 1500° C. × 3 h, permanent linear change | +1.77 | +1.70 | +1.68 | +1.65 | +1.66 | +1.43 | +1.74 | +1.75 | +1.45 | +1.25 | +3.01 | +1.76 | +1.00 | +1.33 | +1.15 | +1.13 |
| Slaking test, cracking | no | no | no | no | no | no | no | no | no | no | no | yes | no | no | no | no |
| Spalling test: number of cycles for cracking to occur | 4 | 5 | 5 | 5 | 4 | 4 | 5 | 6 | 8 | 8 | 7 | 1 | 7 | 6 | 7 | 8 |
| Spalling test: ratio of elastic modulus (Ea/Eb) | 0.38 | 0.29 | 0.19 | 0.27 | 0.26 | 0.31 | 0.39 | 0.89 | 0.58 | 0.59 | 0.55 | 0.56 | 0.54 | 0.59 | 0.53 | 0.53 |

What is claimed is:

1. A castable refractory comprising:
   (i) 100 parts by weight of a matrix composed of:
   (a) 3–20 wt % magnesia clinker having a particle diameter smaller than 0.21 mm and containing at least 95 wt % MgO;
   (b) 0.5–3 wt % alumina cement in terms of CaO; and
   (c) remainder alumina;
   (ii) 0.1–3 parts by weight amorphous silica; and
   (iii) 3–9 parts by weight alumina coarse grains having a particle diameter of 8–20 mm.

2. A castable refractory comprising:
   (i) 100 parts by weight of a matrix composed of:
   (a) 3–20 wt % magnesia clinker having a particle diameter smaller than 0.21 mm and containing at least 95 wt % MgO;
   (b) 0.5–3 wt % alumina cement in terms of CaO; and
   (c) remainder alumina raw material and spinel raw material in a weight ratio of 1:1 to 1:0.05;
   (ii) 0.1–3 parts by weight amorphous silica; and
   (iii) 3–9 parts by weight alumina coarse grains having a particle diameter of 8–20 mm.

3. The castable refractory of claims 1 or 2 wherein the alumina coarse grains are partly or entirely replaced by $MgO$-$Al_2O_3$ spinel coarse grains having a particle diameter of 8–20 mm and containing more than 70 wt % $Al_2O_3$.

* * * * *